United States Patent [19]
Sato et al.

[11] Patent Number: 5,368,762
[45] Date of Patent: Nov. 29, 1994

[54] METHOD FOR PRODUCING VANADIUM ELECTROLYTIC SOLUTION

[75] Inventors: Kanji Sato, Kashima; Masato Nakajima, Inashiki; Ko Magome, Inashiki, all of Japan

[73] Assignee: Kashima-Kita Electric Power Corporation, Ibaraki, Japan

[21] Appl. No.: 41,208

[22] Filed: Apr. 1, 1993

[30] Foreign Application Priority Data

Apr. 9, 1992 [JP] Japan ................................. 4-088706

[51] Int. Cl.[5] ............................................. C01G 31/00
[52] U.S. Cl. ..................................... 252/62.2; 423/67; 423/544; 429/205; 204/86
[58] Field of Search ............... 423/67, 544, 549; 204/86; 429/205; 252/62.2

[56] References Cited

U.S. PATENT DOCUMENTS

| | | | |
|---|---|---|---|
| 4,126,663 | 11/1978 | Pitts | 423/63 |
| 4,786,567 | 11/1988 | Skyllas-Kazacos et al. | 429/19 |
| 4,913,885 | 4/1990 | Seon et al. | 423/67 |
| 5,250,158 | 10/1993 | Kaneko et al. | 204/86 |

FOREIGN PATENT DOCUMENTS 0151923 11/1981 Germany .................... 423/544
WO89/05363 6/1989 WIPO .

OTHER PUBLICATIONS

Inorganic Syntheses–vol. VII, 1963, pp. 92–94, Ludwig F. Audrieth, et al.

*Primary Examiner*—Gary P. Straub
*Assistant Examiner*—Timothy C. Vanoy
*Attorney, Agent, or Firm*—Oblon, Spivak, McClelland, Maier & Neustadt

[57] ABSTRACT

Tri- and tetravalent vanadium solutions suitable for a redox battery are produced as follows. Vanadium pentaoxide or ammonium vanadium is reduced in the presence of a concentrated sulfuric acid and a reducer, thus producing a solution containing tetravalent vanadium. At least a portion of the trivalent vanadium solution is heated to 180°–250° C., thus producing a trivalent vanadium compound. If the trivalent compound produced is a solid, it is collected and solubilized in water and/or sulfuric acid. Then, unreacted sulfur is filtered out, thus obtaining a trivalent vanadium solution.

9 Claims, 4 Drawing Sheets

METHOD FOR PRODUCING VANADIUM ELECTROLYTIC SOLUTION

BACKGROUND OF THE INVENTION

1. Field of the Invention

The present invention relates to a method for producing an electrolytic solution for redox batteries and, more particularly, to a method for simultaneously producing both trivalent and tetravalent vanadium electrolytic solutions.

2. Description of the Related Art

In recent years, through global problems such as acid rain, the destruction of the ozone layer by fluorocarbons, and the greenhouse effect due to an increase in carbon dioxide in the atmosphere, environmental problems are being focussed upon as a problem for all mankind. In the midst of this state of affairs, the movement to make the fullest possible use of solar energy, an inexhaustible and clean form of energy that is friendly towards the earth, has increased considerably. Examples of this include solar batteries, power generation making use of solar heat or heat reclamation, wind-turbine generation, and wave power generation (power generation making use of the energy of ocean currents, or temperature differences of seawater).

Of all of these, it is solar batteries, with a remarkable revolution in technology, that show signs of heading towards the time when they are ready for genuine practical applications, through improvements in their efficiency and a significant lowering in price. Currently, use of solar batteries is restricted to rather small-scale applications such as in powering road signs and communications relays, but rapid developments are also expected through envisioned solar energy cities and the implementation of designs to lay fields of batteries in the oceans or deserts. However, the power output of all of these power generation methods making use of solar energy is affected by climactic conditions, thus making stable and trustworthy production of electrical power impossible. Coordinated use of solar energy and reliable, effective batteries are required, and the realization there of has been long awaited.

Moreover, electrical power may be easily converted into other types of energy, is easy to control, and causes no environmental pollution at the time of its consumption, and it is for these reasons that the percentage of total consumption taken up by electrical power is increasing every year. The distinguishing characteristic of electrical power is that its production and consumption are simultaneous with each other, and that it cannot be stored. It is for this reason that, at present, highly efficient nuclear power generation and advanced thermal power generation are being operated at the highest possible efficiency ratings, and that increase in the large demand for electricity during daylight hours is being met by with small-scale thermal and hydropower generation suitable for generating power in response to fluctuations in consumption of electrical power; thus the current state of affairs is such that excess energy is being produced at night. The power generation world is earnestly hoping for development of technology that will make it possible to store this excess energy at night and use it efficiently during the day.

From circumstances such as those above, all types of secondary batteries have been studied as a method of storing electrical energy which does not pollute the environment and as an energy with a wide variety of applications. Redox batteries have received special attention as a high-volume stationary battery capable of operating at room temperatures and atmospheric pressure.

Redox batteries pass an electrically active materials of postive and negative solution to the cells with flow-through electrodes, and making use of a redox reaction, perform charging and discharging of batteries, and thus have a comparatively longer life than normal secondary batteries, with minimized self-discharging, and possess the advantages of being high in both reliability and safety. In recent years the actualization of redox batteries have received considerable attention.

At present, redox batteries which are held to be in the stage of practical use, that is those with redox couple of bivalent and trivalent chromium vs. bivalent and trivalent iron, cannot be made to have concentrated solutions due to crossmixing with iron and chromium passing through the membrane of the cells and limitations on solubility. Also, with an output voltage for a single cell of approximately 0.9-1 volts (V), their energy density is low. Furthermore, when the charged state of the electrodes becomes unequal due to generation of hydrogen on the negative electrode, there is the danger of generating chlorine from the positive electrode during charging.

On the other hand, there has also been a proposal for a redox battery with postive and negative electrodes which have trivalent and bivalent ion pairs, and tetravalent and pentavalent vanadium dissolved in a sulfuric solution (U.S. Pat. No. 4,786,567, Journal of Power Sources 15 (1985) 179-190 and 16 (1985) 85-95). This battery has a high output voltage of 1.4V to 1.5V, and is characterized by its high efficiency and high energy density, but in order to obtain a high-density vanadium solution, costly vanadyl sulfate must be used, and this has been viewed as being poorly suited for practical use.

In order to solve the above problems, the present inventors have proposed in U.S. Ser. No. 07772,794 now U.S. Pat. No. 5,250,158 a method for producing at low cost a vanadium electrolytic solution by reducing, in the presence of an inorganic acid, vanadium compounds recovered from the ash produced by combustion of heavy oil fuels.

A redox battery comprises end plates; positive and negative carbon cloth electrodes provided between the end plates; and a separating membrane which is made of an ion exchange membrane and placed between the positive and negative carbon cloth electrodes. The electrolytic solutions for the positive and negative electrodes are supplied to the respective electrodes from respective tanks. To initially charge the redox battery, a tetravalent vanadium electrolytic solution is put into both of the tanks and, then, electrolytic reduction is performed. Tetravalent vanadiums are oxidized to become pentavalent vanadiums at the positive electrode and reduced to become trivalent vanadiums at the negative electrode. Then, the resultant pentavalent vanadium electrolytic solution at the positive electrode must be replaced with or made into a tetravalent vanadium electrolytic solution before the redox battery can be used. This solution replacement requires substantial work and specialized equipment, thus increasing production costs. Because of this problem, there is a need for a method in which a trivalent vanadium electrolytic solution and a tetravalent vanadium electrolytic solution are simultaneously prepared. Preferably, a chemical reduction method should be employed instead of the electrolytic reduction to prepare a trivalent vanadium electrolytic solution, because chemical reduction is more economical.

Methods for chemically reducing pentavalent vanadium compounds to trivalent vanadium compounds are described in "Inorganic Chemistry" (Maruzen Asian Edition) by R. B. Heslop and P. L. Robinson. These methods are conducted as follows:

$$V_2O_5 \rightarrow H_2 \text{ (heated)} \rightarrow V_2O_3 + 2H_2O$$

$$V_2O_5 \rightarrow CS_2 \text{ (heated)} \rightarrow V_2S_3$$

$$V_2O_5 \rightarrow Zn \text{ (in sulfuric acid)} \rightarrow V_2(SO_4)_3$$

These methods are not suitable for preparing a vanadium electrolytic solution for a redox battery, because the trivalent vanadium compounds produced by these methods are mixtures or contaminated with metals which are not desired in a vanadium electrolytic solution.

"Inorganic Synthesis", vol. 7, p. 92, describes a method which heats a concentrated sulfuric acid solution containing vanadium pentaoxide and sulfur. However, the reaction rate in this method is very slow. Further, the resultant vanadium sulfate $V_2(SO_4)_3$ must be separated from unreacted sulfur by suspending the resultant mixture in a carbon disulfide-50% ethanol mixed solution, decanting sulfur aggregated on the suspension surface, filtering the remaining suspension, and rinsing the thus-obtained solid with water, and thus obtain the vanadium sulfate $V_2(SO_4)_3$. This process must be repeated many times to substantially remove unreacted sulfur from the vanadium sulfate. Further, because vanadium sulfate is insoluble in diluted and concentrated sulfuric acid solutions, it cannot be immediately used to prepare a trivalent vanadium electrolytic solution. Thus, this method is not suitable for the industrial-scale production of a trivalent vanadium electrolytic solution.

SUMMARY OF THE INVENTION

The present invention is intended to substantially eliminate the above-described problems. Accordingly, an object of the present invention is to provide a method which simultaneously produces trivalent vanadium- and tetravalent-vanadium-sulfuric acid electrolytic solutions by using a reducing agent to reduce, in an inorganic acid solvent, a pentavalent vanadium compound such as vanadium pentaoxide or ammonium metavanadate.

To achieve the above objects, the present invention provides a method for producing electrolytic solutions containing vanadium as positive and negative electrode active materials, the electrolytic solutions being suitable for a redox battery, the method comprising: a first step in which a pentavalent vanadium compound is reduced in the presence of an inorganic acid and a solvent under atmospheric or increased pressure so as to produce a solution containing tetravalent vanadium; a second step in which at least a portion of the solution containing tetravalent vanadium is heated in the presence of an inorganic acid and a reducing agent under atmospheric or increased pressure so as to produce a trivalent vanadium compound; a third step, which is performed if the trivalent vanadium compound obtained in the second step is solid, in which the trivalent vanadium compound is isolated and solubilized by hydration so as to prepare a solution thereof.

DESCRIPTION OF THE PREFERRED EMBODIMENT

Examples of the pentavalent vanadium compound used as a starting material in the method of the present invention are vanadium pentaoxide and ammonium metavanadate. Preferred is vanadium pentaoxide.

The first step substantially produces a tetravalent vanadium solution by reducing a pentavalent vanadium compound. For example, vanadium pentaoxide is partially or entirely reduced in a sulfuric acid solution, whose concentration has been adjusted so that the finally-produced electrolytic solution has a predetermined composition, at a temperature within a range from room temperature to below 180° C., under atmospheric or increased pressure by using a reducing agent selected from the group consisting of: hydrogen, sulfur dioxide, sulfur, hydrogen sulfide, ammonium sulfide, and mixtures of any two or more of the foregoing substances, preferably by using sulfurous acid gas or sulfur. A high-concentration vanadium solution is thus obtained. In this step, the pentavalent vanadium is reduced only to tetravalent vanadium. Thus, the first step produces a tetravalent vanadium solution, Examples of the inorganic acid used in the method of the present invention are sulfuric acid, hydrochloric acid, and nitric acid, sulfuric acid being the most preferable.

The second step produces a trivalent vanadium solution by reducing the tetravalent vanadium solution produced in the first step. If necessary, a desired amount of the tetravalent vanadium solution is put aside, and the remaining solution is reduced in the presence of an inorganic acid and a reducing agent under atmospheric or increased pressure. If an inorganic acid and a reducing agent have been used in the first step, such substances are added to the solution only if they are required in the second step. Examples of the reducing agent used in the second step are sulfur, hydrogen sulfide, ammonium sulfide, mixtures of any two or more of these listed substances, and mixtures of any of these listed substances and sulfur dioxide or hydrogen. The amount of the reducing agent used is 1 mole or greater, preferably 1.5–3.0 moles, per one gram atom of the vanadium contained in the solution. The ratio of the amounts of tetravalent and trivalent vanadiums produced can be adjusted by varying the above-mentioned mole ratio, the reaction temperature and the reaction time, The reduction is performed under atmospheric pressure or a pressure of about 1–50 kg/cm².

The reaction temperature varies depending on the kinds of vanadium compounds and reducing agents used, and the concentration of the sulfuric acid solutions used. However, the reactions should be performed at 180°–250° C. while stirring. Below 180° C., the reduction will likely fail to sufficiently progress. Above 250° C., the trivalent vanadium compound is liable to decompose.

As the reaction temperature rises, formation of trivalent vanadium starts at about 180° C., and the reaction solution changes from a blue to a greenish color and then the trivalent vanadium compound starts to precipitate. As the reaction is further continued, the precipitate exhibits a yellow color. If it is desired that the trivalent vanadium compound be obtained in the form of a solid, the compound can be collected at this phase. If the reaction is further continued, the precipitate starts to redissolve, thus obtaining a trivalent vanadium solution.

If the trivalent vanadium obtained in the second step is solid, the reaction solution is subjected to filtration and/or centrifugation after the reaction. The solid is thus separated. The separated liquid, which is a tetravalent vanadium solution, is collected and used in the third step to dissolve the trivalent vanadium compound.

In the third step, the solid trivalent vanadium compound is mixed with water or a mixture of water and an inorganic acid, such as sulfuric acid, and the resultant mixture is allowed to react at about 20°–250° C., thus solubilizing the solid trivalent vanadium. A trivalent vanadium solution exhibiting a green color is thus obtained. If a solid reducing agent, such as sulfur, has been used, the solution can be easily separated from the remaining reducing agent, such as sulfur, by filtration and/or centrifugation.

If a trivalent vanadium solution is produced in the second step, tri- and tetravalent vanadium solutions can be simultaneously produced after removing unreacted sulfur by filtration and/or centrifugation.

The method of the present invention can be performed in both batch and continuous manners. Further, the method of the present invention can be performed by using only one reaction chamber if variation of the reaction temperatures and scheduling of the reactions are appropriately determined.

Though the mechanism of the reduction of vanadium has not been made clear, "Inorganic Synthesis" vol. 7, p. 92 describes the following stoichimetric formula:

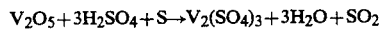
$$V_2O_5 + 3H_2SO_4 + S \rightarrow V_2(SO_4)_3 + 3H_2O + SO_2$$

The present inventors consider that the reduction progresses as follows. $V^{5+}$ is reduced to $V^{4+}$ at about 110°–120° C. by sulfur which, in turn, is oxidized up to sulfuric anhydride. The reaction formula of this process is:

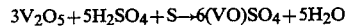
$$3V_2O_5 + 5H_2SO_4 + S \rightarrow 6(VO)SO_4 + 5H_2O$$

Then, reduction of $V^{4+}$ to $V^{3+}$ starts at about 170° C. or greater. The reaction formula of this process is:

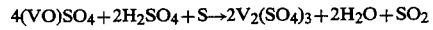
$$4(VO)SO_4 + 2H_2SO_4 + S \rightarrow 2V_2(SO_4)_3 + 2H_2O + SO_2$$

Thus, the reaction formula of the overall process is:

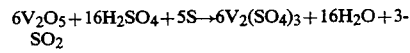
$$6V_2O_5 + 16H_2SO_4 + 5S \rightarrow 6V_2(SO_4)_3 + 16H_2O + 3SO_2$$

With the method of the present invention, both tetra- and trivalent vanadium solutions can be simultaneously produced by reduction of pentavalent vanadium using an easily-available reducing agent, such as sulfur, hydrogen sulfide, sulfur dioxide, hydrogen or ammonium sulfide. The ratio between the amounts of the tetravalent and trivalent vanadium solutions produced can be desirably adjusted by varying the vanadium-reducing agent mole ratio, the reaction temperature and the reaction time. The tetravalent and trivalent vanadium compounds can be clearly separated from each other by utilizing the low solubility of the trivalent vanadium compound in sulfuric acid.

Further, because the reaction products are the same as components of the electrolytic solution system, there is no need for separation and purification processes, such as extraction, distillation, absorption, etc. The tri- and tetravalent vanadium compounds can be separated not only by the abovementioned process but also by utilizing the difference in their reaction temperatures, that is, synthesizing a tetravalent vanadium solution in a low temperature range and a trivalent vanadium solution in a high temperature range.

The method of the present invention can be used to recycle electrolytic solutions. Thus, vanadium can be reused practically an unlimited number of times. Aside from the initial costs, the vanadium electrolytic solution is expected to become less expensive than the Fe-Cr electrolytic solution. If a bivalent vanadium solution should be needed for, e.g., an electric motor vehicle, it can be easily provided by electrolytically reducing the trivalent vanadium solution. Thus, the method of the present invention significantly reduces required electricity and costs,

EXAMPLES

The present invention will be specifically described with reference to the following examples.

EXAMPLE 1

Figure 1:
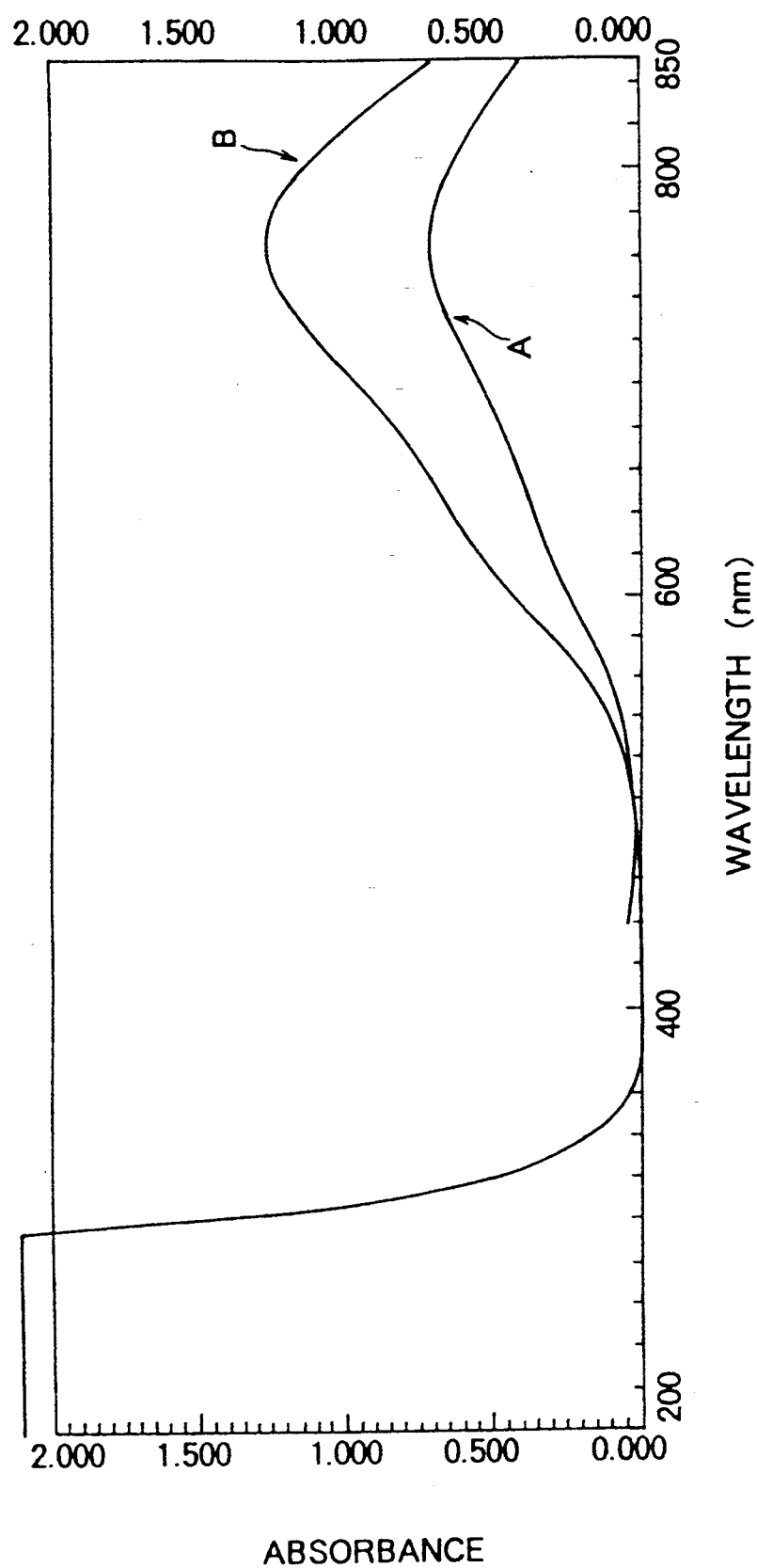
FIG. 1 shows the absorption curves in the UV and visible region of a tetravalent vanadium solution prepared from $V_2O_5$ by the method of the present invention (curve-A) and a tetravalent vanadium solution prepared by dissolving (VO) $SO_4$(reagent grade) in sulfuric acid (curve-B).

18.2 g (0.1 mol) of vanadium pentaoxide and 100 ml of 6% sulfurous acid solution were put into a 500-ml three-neck flask. While stirring the solution in the flask, a concentrated sulfuric acid solution was gradually added thereto. After complete dissolution, 4.8 g (0.15 mol) of sulfur and 120 ml of a concentrated sulfuric acid solution were added. While vigorously stirring, the solution in the flask was heated by a mantle heater. The reaction was conducted at temperatures maintained substantially within the range between 180° and 200° C. for 6 hours, and then stopped when white gas of sulfuric anhydride was produced. After cooling the flask by allowing it to stand, the supernatant was decanted. The precipitate was thoroughly mixed with water, followed by suction filtration. The filtrate was a very light blue solution of tetravalent vanadium (VO) $SO_4$, and the solid obtained was crystals of trivalent vanadium $V_2(SO_4)_3$, exhibiting a yellow color. This solid was dried at about 110° C. for one hour, obtaining a yield of about 40.2 g. The absorption curves in the UV and visible regions of tetravalent vanadium solutions are shown in FIG. 1.

Next, 19.5 g of the thus-obtained $V_2(SO_4)_3$ crystals, 20 ml of a concentrated sulfuric acid solution and 80 ml of water were placed in a reaction chamber having a reflux tube and allowed to react at about 110° C. for 6 hours, thus producing a trivalent vanadium solution exhibiting a dark green color. Unreacted sulfur initially existing together with the crystals was aggregated into spherical particles and thus precipitated in the solution. This precipitate was filtered out.

Figure 2:
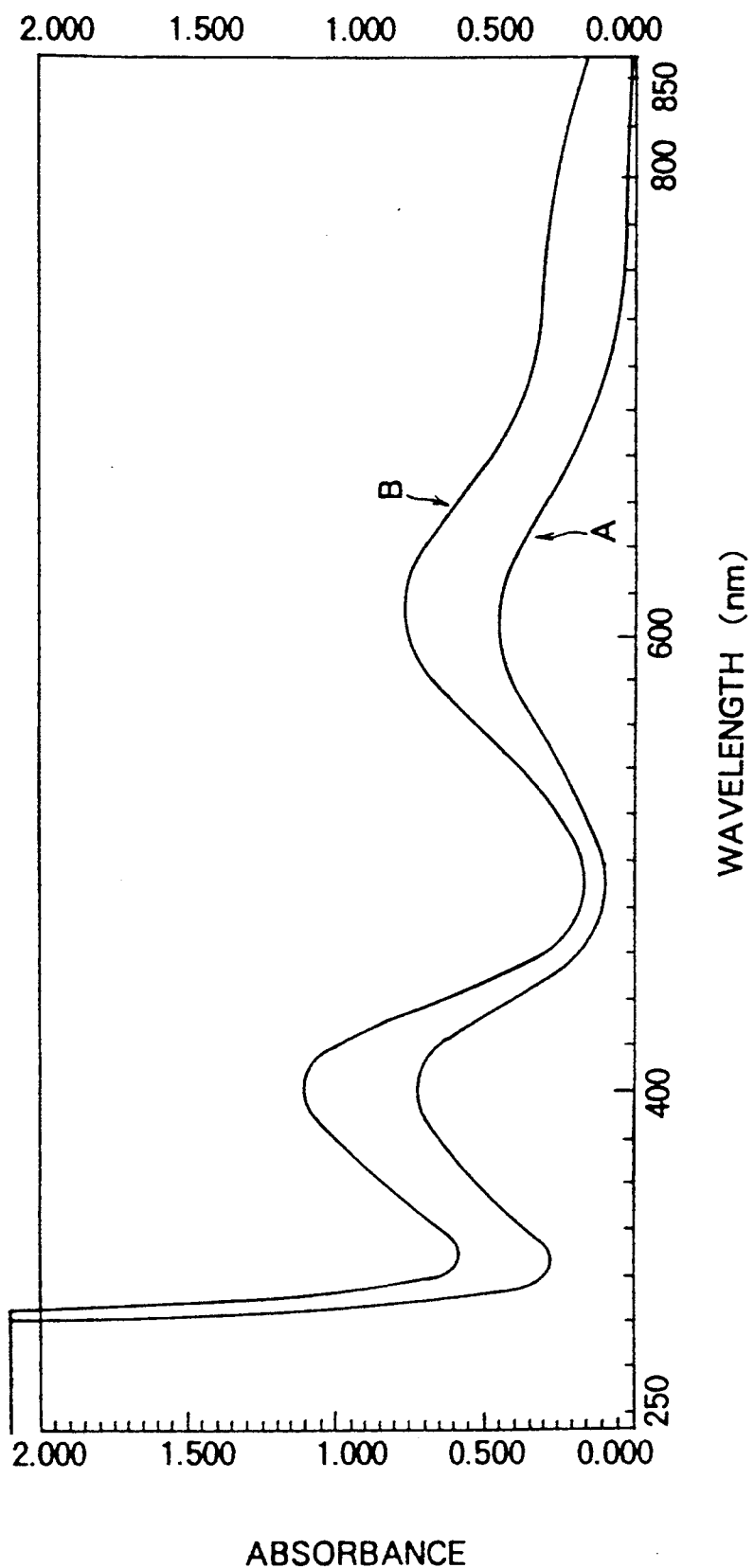
FIG. 2 shows the absorption curves in the UV and visible region of a trivalent vanadium solution prepared by from $V_2O_5$ the method of the present invention (curve-A) and a trivalent vanadium solution prepared obtained by electrolytic reduction of a (VO) $SO_4$ solution in sulfuric acid (curve-B).
Figure 3:
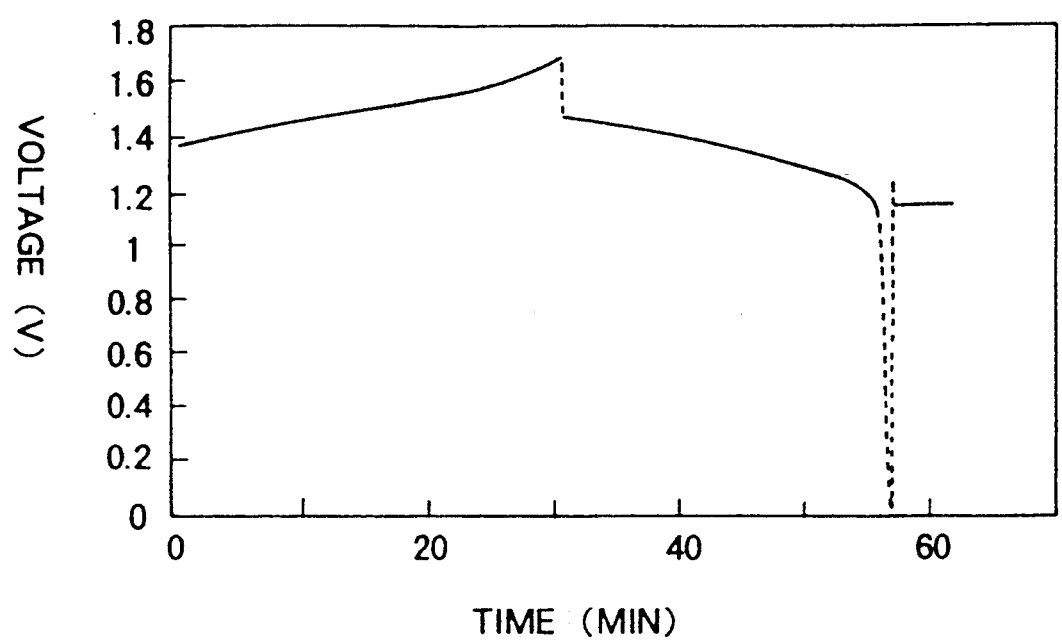
FIG. 3 shows the charge-discharge curve of a vanadium redox battery using electrolytic solutions prepared by the method of the present invention.

After this filtration, the trivalent vanadium solution was examined by spectrochemical analysis in the ultraviolet and visible regions. The solution exhibited the same absorbance pattern as a trivalent vanadium electrolytic solution prepared by electrolytic reduction. The absorption curves of trivalent vanadium solutions are shown in FIG. 2. Further, a charge-discharge test of a small-size redox flow cell using the obtained solution was performed. The cell exhibited the same charge-discharge characteristics as a small-size redox flow cell using a trivalent electrolytic solution prepared by electrolytic reduction. The charge/discharge characteristics of the small-size redox flow cell using a trivalent vanadium according to the present invention is shown in FIG. 3. Still further, the yield of the trivalent vanadium was determined to be 96% by oxidation-reduction potential titration.

EXAMPLE 2

2.05 g of the $V_2(SO_4)_3$ crystals obtained in Example 1, 80 ml of a concentrated sulfuric acid solution and 20 ml of water were allowed to react at 220° C. for 1.5 hours in the same reaction chamber as used in Example 1. As a result, the $V_2(SO_4)_3$ crystals were completely dissolved, thus obtaining a trivalent vanadium solution exhibiting a dark green color. The precipitate containing unreacted sulfur was removed from the solution by filtration. Subsequently, the solution was examined by spectrochemical analysis in the ultraviolet and visible regions, exhibiting the same absorbance pattern as the trivalent solution prepared by electrolytic reduction of a (VO) $SO_4$ solution in sulfuric acid.

EXAMPLE 3

20 g of the $V_2(SO_4)_3$ crystals obtained in Example 1 and 50 ml of 4M sulfuric acid solution were allowed to react at about 110° C. for 6 hours in the same reaction chamber as used in Example 1. As a result, the $V_2(SO_4)_3$ crystals were completely dissolved, thus obtaining a trivalent vanadium solution exhibiting a dark green color. The precipitate containing unreacted sulfur was removed from the solution by filtration. Subsequently, the solution was examined by spectrochemical analysis in the ultraviolet and visible regions, exhibiting the same absorbance pattern as the trivalent solution prepared by electrolytic reduction of a (VO)$SO_4$ solution in sulfuric acid.

EXAMPLE 4

0.54 g of the $V_2(SO_4)_3$ crystals obtained in Example 1, 25 ml of a concentrated sulfuric acid solution and 75 ml of water were allowed to react at about 110° C. for 6 hours in the same reaction chamber as used in Example 1. As a result, the $V_2(SO_4)_3$ crystals were completely dissolved, thus obtaining a trivalent vanadium solution exhibiting a dark green color. The precipitate containing unreacted sulfur was removed from the solution by filtration. Subsequently, the solution was examined by spectrochemical analysis in ultraviolet and visible regions, exhibiting the same absorbance pattern as the trivalent solution prepared by electrolytic reduction of a (VO)$SO_4$ solution in sulfuric acid.

EXAMPLE 5

18.2 g of vanadium pentaoxide (containing 0.2 mol of vanadium atom), 58.8 ml of a concentrated sulfuric acid solution (having a specific gravity of 1.84 and a purity of 97%), 4.8 g (0.15 mol) of sulfur and 100 ml of water were allowed to react in a 500-ml three-neck flask having a reflux tube, while being vigorously stirred. In the beginning, the reaction temperature leveled off substantially in the range between 120° and 130° C., and the solution gradually turned blue, indicating production of $V^{4+}$. The reaction was conducted for 4 hours, thus completely dissolving the vanadium pentaoxide. After cooling the solution, a sample thereof was obtained. The sample was examined by spectrochemical analysis in the UV and visible regions, exhibiting the same absorbance pattern as a solution of (VO)$SO_4$.$3H_2O$ (reagent grade) in sulfuric acid. The reaction was further continued for 4 more hours at a temperature increased to about 170°–210° C., causing precipitation of yellow crystals. After adding water, the solution was allowed to further react at about 110–120° C. for 4 hours, thus dissolving the yellow crystals. After the reaction, unreacted sulfur was filtered out. The filtrate exhibited green, and was determined to be a trivalent vanadium solution by spectrochemical analysis in the UV and visible regions.

EXAMPLE 6

The reaction was conducted by using, as the starting vanadium compound, ammonium metavanadate (produced by Kashima-Kita Electric Power Corporation) which had been recovered from ash produced when a high-sulfur heavy oil was burned in a boiler. This recovered ammonium metavanadate contained the following contaminants: Si 0.2%, Ni<0.01%, Fe<0.01%, Mg<0.05%, Ca<0.01%, Na<0.01%, and Al<0.05%.

116.98 g (1 mol) of the recovered ammonium metavanadate was mixed with 160 ml of a concentrated sulfuric acid solution and water so as to obtain a mixture of 500 ml. While sulfur dioxide gas was bubbled through the mixture, it was vigorously stirred at room temperature until the ammonium metavanadate was completely dissolved. The solution was separated from silicon by suction filtration. Then, 50 ml of the thus-obtained solution (containing 0.1 mol of vanadium), 9.6 g (0.3 mol) of sulfur and 50 ml of a concentrated sulfuric acid solution were placed in a flask, followed by substantially the same process as in Example 1. Then, the reaction solution was filtered under reduced pressure, thus obtaining a tetravalent vanadium solution and green precipitate.

Figure 4:
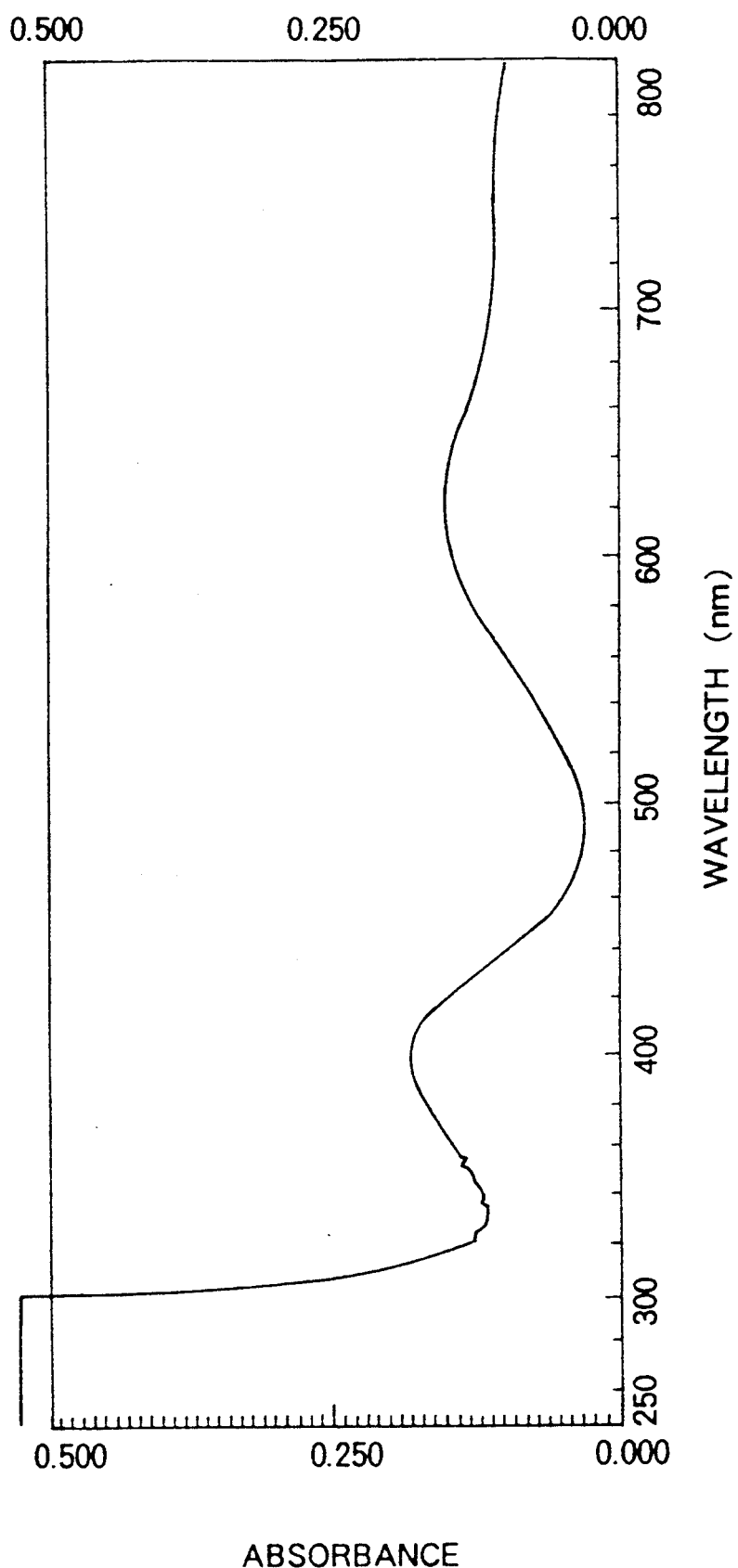
FIG. 4 shows the absorption curve in the UV and visible region of a tetravalent vanadium solution prepared from $NH_4[V(SO_4)_2]$ by the method of the present invention.

0.52 g of the green precipitate, 80 ml of a concentrated sulfuric acid solution and 20 ml of water were allowed to react at 210° C. for one hour in the same reaction chamber as used in the earlier process. As a result, the precipitate was completely dissolved, thus obtaining a trivalent vanadium solution exhibiting a dark green color. After filtering out unreacted sulfur, the solution was examined by spectrochemical analysis in the UV and visible regions, exhibiting the same absorbance pattern as the trivalent vanadium solution prepared by electrolytic reduction of a (VO)$SO_4$ solution in sulfuric acid. The absorption spectra of trivalent vanadium solution are shown in FIG. 4. The charge-discharge characteristics of a small-size redox flow cell using the trivalent vanadium solution obtained in this example were substantially the same as those of the small-size redox flow cell using the trivalent vanadium solution prepared by electrolytic reduction of a (VO) SO$_4$ solution in sulfuric acid.

EXAMPLE 7

0.3 g of the green precipitate obtained in Example 6, 20 ml of a concentrated sulfuric acid solution and 80 ml of water were allowed to react at about 110° C. for 6 hours in the same reaction chamber as used in Example 6. As a result, the precipitate was completely dissolved, thus obtaining a trivalent vanadium solution exhibiting a dark green color. After filtering out unreacted sulfur, the solution was examined by spectrochemical analysis in the UV and visible regions, exhibiting the same absorbance pattern as the trivalent vanadium solution prepared by electrolytic reduction of a (VO) SO$_4$ solution in sulfuric acid.

COMPARATIVE EXAMPLE 1

0.3 g of the green precipitate obtained in Example 6 and 100 ml of water were allowed to react at about 110° C. for 6 hours in the same reaction chamber as used in Example 6, without using a concentrated sulfuric acid solution. As a result, the green precipitate barely dissolved.

COMPARATIVE EXAMPLE 2

0.3 g of the green precipitate obtained in Example 6 and 100 ml of a concentrated sulfuric acid solution were allowed to react at about 110° C. for 6 hours in the same reaction chamber as used in Example 6, without adding water. As a result, the green precipitate barely dissolved.

What is claimed is:

1. A method for producing electrolytic solutions containing vanadium as positive and negative electrode active materials, said electrolytic solutions being suitable for a redox battery, said method comprising:

a first step in which a pentavalent vanadium compound is reduced in the presence of sulfuric acid and a solvent under atmospheric or increased pressure so as to produce a solution containing tetravalent vanadium;

a second step in which at least a portion of said solution containing tetravalent vanadium is heated in the presence of sulfuric acid, a solvent and a reducing agent under atmospheric or increased pressure so as to produce a trivalent vanadium compound; and a third step, which is performed if said trivalent vanadium compound obtained in said second step is solid, in which said trivalent vanadium compound is isolated from said solution and then solubilized by hydration with water or a mixture of water and sulfuric acid so as to prepare a solution thereof.

2. A method according to claim 1 wherein the first step is carried out using a reducing agent selected from the group consisting of hydrogen, sulfur dioxide, sulfur, hydrogen sulfide and ammonium sulfide, and mixture thereof.

3. A method according to claim 1 wherein the second step is carried out using a reducing agent selected from the group consisting of sulfur, hydrogen sulfide, ammonium sulfide, and a mixture of one of the foregoing substances with sulfur dioxide or hydrogen.

4. A method according to claim 1 wherein said second step is performed at a temperature within a range between about 180° C. and 250° C.

5. A method according to claim 1 wherein said solvent is water.

6. A method according to claim 1 wherein said vanadium compound is vanadium pentaoxide or ammonium metavanadate.

7. A method according to claim 1 wherein said first step and said second step are performed under a pressure within a range of between 1 and 50 kg/cm$^2$.

8. A method according to claim 1 wherein in said third step, a solid trivalent vanadium compound is solubilized by conducting a reaction thereof in the presence of either water or water and sulfuric acid at a temperature within a range of between 40° and 250° C.

9. A method according to claim 1 wherein said pentavalent vanadium compound is selected from the group consisting of vanadium pentaoxide and ammonium metavanadate.

* * * * *